(12) United States Patent  
Marche

(10) Patent No.: US 7,232,091 B2  
(45) Date of Patent: Jun. 19, 2007

(54) MOUNTING SYSTEM INSERTED BETWEEN AN AIRCRAFT ENGINE AND A RIGID STRUCTURE OF AN ATTACHMENT STRUT FIXED UNDER A WING OF THIS AIRCRAFT

(75) Inventor: Herve Marche, Roquettes (FR)

(73) Assignee: Airbus France, Toulouse (FR)

( * ) Notice: Subject to any disclaimer, the term of this patent is extended or adjusted under 35 U.S.C. 154(b) by 149 days.

(21) Appl. No.: 11/059,444

(22) Filed: Feb. 17, 2005

(65) Prior Publication Data

US 2005/0194493 A1 Sep. 8, 2005

(30) Foreign Application Priority Data

Mar. 4, 2004 (FR) .................................. 04 50445

(51) Int. Cl.  
*B64D 27/18* (2006.01)

(52) U.S. Cl. ...................................... 244/54

(58) Field of Classification Search ............. 244/53 R, 244/54, 55, 58, 60, 131; 60/796, 797; 248/554, 248/555, 556, 557, 674, 637  
See application file for complete search history.

(56) References Cited

U.S. PATENT DOCUMENTS

| 4,022,018 | A |   | 5/1977  | Tuten et al. |
| 4,458,863 | A | * | 7/1984  | Smith ........................... 244/54 |
| 5,319,922 | A | * | 6/1994  | Brantley ....................... 60/797 |
| 5,385,013 | A | * | 1/1995  | Barron et al. ................. 60/782 |
| 5,746,391 | A | * | 5/1998  | Rodgers et al. ............... 244/54 |
| 6,126,110 | A |   | 10/2000 | Seaquist et al. |

FOREIGN PATENT DOCUMENTS

| EP | 0 522 688 A2 | 1/1993 |
| FR | 2 698 848    | 6/1994 |

\* cited by examiner

*Primary Examiner*—Timothy D. Collins  
(74) *Attorney, Agent, or Firm*—Oblon, Spivak, McClelland, Maier & Neustadt, P.C.

(57) ABSTRACT

This invention relates to a mounting system (100) inserted between an aircraft engine (2) and a rigid structure (4) of an attachment strut (6) fixed under a wing (8) of this aircraft, the system including a forward mount (16), an aft mount (18) and a device (20, 120, 220) for resisting thrusts generated by the engine (2). The system also comprises additional means (23) for opposing the longitudinal bending of the engine (2), these additional means (23) being designed to resist loads only starting from a predetermined deformation of this engine (2). According to the invention, the additional means (23) comprise at least one connecting rod (32) capable of opposing longitudinal bending of the engine (2), each connecting rod (32) being connected firstly to the rigid structure (4) of the strut (6) and secondly to a fan casing (26) of the engine (2), so that it is only stressed starting from the predetermined deformation of this engine (2).

22 Claims, 8 Drawing Sheets

MOUNTING SYSTEM INSERTED BETWEEN AN AIRCRAFT ENGINE AND A RIGID STRUCTURE OF AN ATTACHMENT STRUT FIXED UNDER A WING OF THIS AIRCRAFT

TECHNICAL DOMAIN

This invention relates in general to a mounting system inserted between an aircraft engine and a rigid structure of an attachment strut fixed under a wing of this aircraft.

The invention also relates to an attachment strut for an aircraft engine fitted with such a mounting system.

The mounting system and the attachment strut as indicated above can be used on any type of aircraft, and more particularly on aircraft equipped with large diameter fan engines.

STATE OF PRIOR ART

An aircraft attachment strut is designed to form the connecting interface between an engine and a wing of the aircraft. It transmits forces generated by the associated engine to the structure of this aircraft, and it also enables routing of the fuel, electricity, hydraulics and air between the engine and the aircraft.

In order to transmit forces, the strut comprises a rigid structure, for example of the <<caisson>> type, in other words formed by the assembly of upper and lower stringers connected to each other through transverse ribs.

Furthermore, the strut is equipped with a mounting system inserted between the engine and the rigid structure of the strut, this system globally including at least two mounts, generally a forward mount and an aft mount, and a device for resisting thrusts generated by the engine. For example, this device may be in the form of two lateral connecting rods connected firstly to a forward part of the central casing of the engine, and secondly to the aft mount.

Similarly, the attachment strut also comprises a second mounting system inserted between the strut and the wing of the aircraft, this second system normally being composed of two or three mounts.

Finally, the strut is provided with a secondary structure segregating and maintaining the systems while supporting aerodynamic fairings.

In a manner known to those skilled in the art, a high aerodynamic force can be created on the engine air inlet under some flight conditions and mainly during take off, thus causing significant longitudinal bending of the engine, namely bending resulting from a torque applied about a transverse axis of the aircraft.

Two cases can arise when this type of longitudinal bending occurs. In a first case in which no particular precautions have been taken related to the observed bending, high friction inevitably occurs firstly between the rotating blades of the fan and the fan casing, and secondly between the rotating compressor and turbine blades and the engine central casing. The main consequence of this friction is then premature engine wear, which naturally reduces the life of the engine and its performances. In a second case in which operating clearances are adapted such that there is practically no contact caused by longitudinal bending, the engine efficiency is then very much reduced.

In this respect, note that the longitudinal bending of the engine that occurs during take off is accentuated when the forward mount of the mounting system is fixed to the central casing of this engine, provided that the air inlet, the fan and the fan casing are then offset. Furthermore, the fact that this bending is a result of an aerodynamic force on the air inlet implies that it is obviously greater when the fan diameter is greater.

Nevertheless, this specific configuration in which the forward mount is located at the central casing of the engine close to its center of gravity, is very advantageous in the sense that it facilitates the design of the attachment strut assembly, the design of the strut and particularly of its mounts that actually depends on the loads applied at the center of gravity of the engine.

To reduce the high longitudinal deformation that takes place during take off, the mounts and the thrust resistance device of the mounting system are usually designed and dimensioned accordingly.

Consequently, due to the large magnitude of the aerodynamic force applied, it is necessary to significantly oversize and increase the complexity of the above mentioned mounts and the thrust resistance device when such a device is provided, compared with a configuration in which these elements would be capable of resisting the unwanted effects of applied thrusts during aircraft cruising phases.

Naturally, the necessary oversizing of the mounting system and its associated increase in mass make the aircraft less optimized, particularly because the takeoff phases account for only a very small proportion of the total life cycle of an aircraft compared with the proportion accounted for by the cruising phases.

OBJECT OF THE INVENTION

Therefore, the purpose of the invention is to propose a mounting system inserted between an aircraft engine and a rigid structure of an attachment strut fixed under a wing of this aircraft, this system at least partially overcoming the disadvantages mentioned above related to embodiments according to prior art.

Another purpose of this invention is to present an aircraft engine attachment strut fitted with such a mounting system.

To achieve this, the object of the invention is a mounting system inserted between an aircraft engine and a rigid structure of an attachment strut fixed under a wing of this aircraft, the system including a forward mount, an aft mount, and a device for resisting thrusts generated by the engine. The system also comprises additional means for opposing the longitudinal bending of the engine, these additional means being designed to resist loads only starting from a predetermined deformation of the engine. According to the invention, the additional means comprise at least one connecting rod capable of opposing longitudinal bending of the engine, each connecting rod being connected firstly to the rigid structure of the strut and secondly to a fan casing of the engine, so that it is only stressed starting from a determined deformation of this engine.

Advantageously, the arrangement proposed by this invention provides a means of designing mounts and the thrust resistance device without needing to be concerned with the high aerodynamic force applied on the engine air inlet during aircraft takeoff phases, but only by taking account of the lower loads encountered during cruising phases.

Longitudinal bending of the engine due to this aerodynamic force is resisted and limited by additional connecting rod type means provided for this purpose, which in any case are active only when the engine reaches the predetermined deformation, this predetermined deformation obviously being selected to translate the fact that the aircraft is in a take off phase or a similar phase like that encountered in flight during severe turbulence.

Thus, mounts and the thrust resistance device are made as a function of the loads that occur during aircraft cruising phases, and therefore they can be made smaller than they would be according to prior art described above, such that their mass can also be lower.

Moreover, the fact of providing two distinct force paths, namely a first force path during cruising phases and a second force path composed of connecting rod(s) that supplement the first path only during the takeoff phases, and the mounts and the thrust resistance device forming the first force path are then advantageously, specifically and exclusively adapted to resist the special load that occurs during cruising phases.

In this respect, longitudinal bending of the engine during cruising phases of the aircraft is entirely caused by a torque about a transverse axis originating from thrusts generated by this engine, and embodiments are then possible in which the thrust resistance device completely cancels out this torque in order to prevent any longitudinal bending of the engine during these cruising phases. In this way, no premature wear of engine constituents occurs during cruising phases, and the life and performances of the engine are thus considerably lower.

Advantageously, note that since the additional connecting rod type means capable of opposing longitudinal bending of the engine are inactive apart from during takeoff phases, the mounting system according to the invention can remain statically determinate during cruising.

By judiciously positioning this/these connecting rods between the fan casing and the rigid structure of the strut in order to create the second force path, it is then possible to provide a forward mount fixed to the central casing of the engine close to the center of gravity of the engine, without any effect on longitudinal bending of the engine that occurs during the takeoff phases.

As mentioned above, the additional means comprise at least one connecting rod capable of opposing longitudinal bending of the engine, each connecting rod being connected firstly to the rigid structure of the strut and secondly to an engine fan casing, so as to be stressed only starting from a predetermined deformation of this engine.

To achieve this, it would be possible for each connecting rod to be connected to the fan casing and/or the rigid structure of the strut through a flexible mount. Thus, it is clear that for each connecting rod in the mounting system, the associated flexible mount is designed such that the engine can bend longitudinally without the connecting rod concerned being mechanically stressed, until the predetermined deformation of the engine is reached. Furthermore, once this predetermined deformation of the engine is reached and therefore the flexible mount itself is deformed to its maximum, the connecting rod then resists mechanical stress, and consequently opposes longitudinal bending of this engine.

Naturally, the flexible mount(s) could be replaced by spring or similar systems to achieve the same technical effect without departing from the scope of the invention.

Preferably, each connecting rod is connected to an aft upper part of the engine fan casing, this position being quite appropriate to resist longitudinal bending of the engine.

When this type of connecting rod solution is used to make the additional means for opposing longitudinal bending of the engine, the additional means may consist of one or two connecting rods.

In a first preferred embodiment of this invention, the thrust resistance device comprises two lateral connecting rods arranged on each side of a central casing of the engine, each lateral connecting rod being connected firstly to a forward part of the central casing of the engine, and secondly to one of the mounts of the system, and preferably the forward mount.

In this first preferred embodiment, as in the other preferred embodiments that will be described below, note that the additional means in the mounting system are preferably made in accordance with one of the solutions including one or two connecting rods.

According to a second preferred embodiment of the present invention, the thrust resistance device comprises a spreader beam provided with an upper arm and two lateral lower arms, the upper and lateral lower arms being fixed and fitted with an upper end and two lateral lower ends of the spreader beam, the two lateral lower ends being placed such that a horizontal plane passes through them and through a longitudinal axis of the engine, the thrust resistance device also being fitted with two fittings on each side of the engine and each comprising a forward end, through which the horizontal plane passing through the longitudinal axis of the engine also passes, and fixed to a forward part of a central casing of the engine and an aft end connected to one of the two lateral lower ends of the spreader beam. Furthermore, the spreader beam is also connected to the forward mount of the mounting system, and to the rigid structure of the attachment strut through its upper end.

Advantageously, the thrust resistance device proposed in this second preferred embodiment considerably improves the resistance of these forces compared with the resistance achieved with the lateral connecting rods solution, since this device entirely cancels out the transverse axis torque applied to the engine and related to these thrusts.

Consequently, the presence of such a thrust resistance device during aircraft cruising phases prevents any longitudinal bending from being applied to the engine. As a result, there is no premature wear of the engine constituents, and therefore the life and performances of the engine are no longer reduced.

Elimination of longitudinal bending in the engine due to thrusts is obtained firstly due to the fact that these forces are resisted in the horizontal plane passing through the longitudinal axis of the engine, which is very advantageous provided that the thrusts are created on the longitudinal axis of this engine.

The proposed arrangement is such that the two lateral lower ends of the spreader beam are located in this horizontal plane passing through the longitudinal axis of the engine, so that they can be connected to the fittings also placed in the same horizontal plane and connected to the forward part of the central casing of the engine.

Furthermore, the thrusts initially resisted in the horizontal plane passing through the longitudinal axis of the engine, through the fittings and lateral lower ends of the spreader beam, are then transported upwards along the length of this spreader beam to three arms stressed in bending. Thrusts transported by the spreader beam are then distributed in two axial forces in opposite directions along the longitudinal direction of the aircraft, one being transmitted to the forward mount to which the spreader beam is connected, and the other being transmitted to the rigid structure of the strut to which the upper end of this spreader beam is connected.

Finally, note that the mounting system is advantageously a statically determinate system, which very much facilitates its design during cruising phases of the aircraft.

Preferably, the spreader beam is connected to the forward mount through at least one swivel pin oriented along a transverse direction of the aircraft. Consequently, one of the two axial forces in opposite directions along the longitudinal direction of the aircraft is exerted along this axis before being transmitted to the forward mount.

Also preferably, the upper end of the upper arm is connected to the rigid structure of the attachment strut using a connecting rod, for example oriented approximately along a longitudinal direction of the aircraft. In this way, it is possible that the upper end of the upper arm is connected to a forward end of the connecting rod through at least one swivel pin oriented along a transverse direction of the aircraft. With this arrangement, the other of the two axial forces in opposite directions oriented along the longitudinal direction of the aircraft will be applied along this axis, before being transmitted to the rigid structure of the strut.

Finally, in this second preferred embodiment, each of the aft ends of the two fittings fixed to the forward part of the central casing of the engine is connected to one of the two lateral lower ends of the spreader beam using a connecting rod.

In the third and fourth preferred embodiments of this invention, the thrust resistance device comprises two lateral actuators arranged one on each side of the engine, each actuator being provided with a rod in which the aft end is connected to one of the mounts, preferably the forward mount, and the forward end of the rod is a piston located inside a chamber fixed to a forward part of a central casing of the engine, the chamber comprising a forward compartment and an aft compartment separated by the piston. Moreover, the thrust resistance device also comprises a hydraulic piston device comprising a piston fixed to the forward mount and located inside a chamber fixed to the forward part of the central casing of the engine, the chamber comprising a forward compartment and an aft compartment separated by the piston, and the forward compartment of the chamber of the hydraulic piston device being hydraulically connected to the aft compartments of the lateral actuators.

Once again, the thrust resistance device is such that it considerably improves resistance of these forces compared with the resistance achieved with the lateral connecting rods solution, since this device can easily be designed to completely cancel out the torque about the transverse axis related to these same thrusts and applied to the engine, by appropriately sizing the two lateral actuators and the hydraulic piston device. As will be described in detail below, the two lateral actuators and the hydraulic piston device then generally act as a vertical spreader beam system in which the forces transmitted to the engine entirely cancel out the torque about the transverse axis during the cruising phases, regardless of the applied thrust.

In the same way as in the second preferred embodiment of this invention, the presence of such a thrust resistance device during the aircraft cruising phases means that no longitudinal bending is applied to the engine. Therefore no premature wear occurs at the components of the engine and the life and performances of the engine are no longer reduced.

Once again, note that the mounting system is a statically determinate system during aircraft cruising phases.

Preferably, in these third and fourth preferred embodiments, the aft compartment of the chamber of the hydraulic piston device is hydraulically connected to the forward compartments of the lateral actuators.

Advantageously, the above mentioned connection also provides a means of canceling out the torque about the transverse axis and longitudinal bending of the engine when it is operating in reverse thrust mode.

Preferably, the forward compartments of the two lateral actuators are hydraulically connected, and the aft compartments of these two actuators are also hydraulically connected. Consequently, the connections made assure that forces passing through each of the two rods of the lateral actuators are approximately equal during cruising phases, without it being necessary to add a spreader beam connecting the two rods to the forward or the aft mount, as was necessary in prior art. Thus, the horizontal spreader beam effect obtained using lateral actuators advantageously enables the thrust resistance device to be smaller than it would be according to prior art.

Preferably, the chambers of the lateral actuators and the hydraulic piston devices are formed inside the forward part of the central casing of the engine, which further reduces the size of the mounting system.

Preferably, the aft end of each of the two rods is connected to the forward mount. Nevertheless, it could obviously be connected to the aft mount without departing from the scope of the invention.

In the third preferred embodiment, the forward compartment of the chamber of the hydraulic piston device is hydraulically connected only to the aft compartments of the lateral actuators.

On the other hand, in the fourth preferred embodiment, the forward compartment of the hydraulic piston device is also hydraulically connected to a high pressure hydraulic supply and is provided with at least one leak orifice for which access can be enabled/disabled by a device fixed to the piston as a function of the hydraulic pressure inside the forward compartment and as a function of thrusts generated by the engine.

Similarly, the aft compartment of the hydraulic piston device may also be hydraulically connected to a high pressure hydraulic supply and be provided with at least one leak orifice for which access can be enabled/disabled by a device fixed to the piston as a function of the hydraulic pressure inside the aft compartment, and as a function of reverse thrusts generated by the engine. Thus, with this arrangement, the thrust resistance device is also operative when the engine is in reverse thrust mode.

In all preferred embodiments presented above, the forward mount is preferably fixed to a forward part of a central casing of the engine and a forward end of a pyramid forming the forward part of the rigid structure of the strut, and the aft mount is preferably fixed to an aft part of the central casing of the engine and the rigid structure of the strut. In this way, this arrangement of the mounts advantageously means that the forward mount can be close to the center of gravity of the engine.

Another object of the invention is an attachment strut for an aircraft engine under a wing of this aircraft, the strut being provided with a mounting system inserted between the engine and a rigid structure of this strut. According to the invention, the mounting system is like that described above and is also one purpose of this invention.

Other advantages and special features of the invention will become clearer in the non-limitative detailed description given below.

BRIEF DESCRIPTION OF THE DRAWINGS

This description will be made with reference to the appended figures, wherein.

DETAILED DESCRIPTION OF PREFERRED EMBODIMENTS

Firstly, note that elements on FIGS. 1 to 9 showing four preferred embodiments of this invention marked with the same numeric references relate to identical or similar elements.

Figure 1:
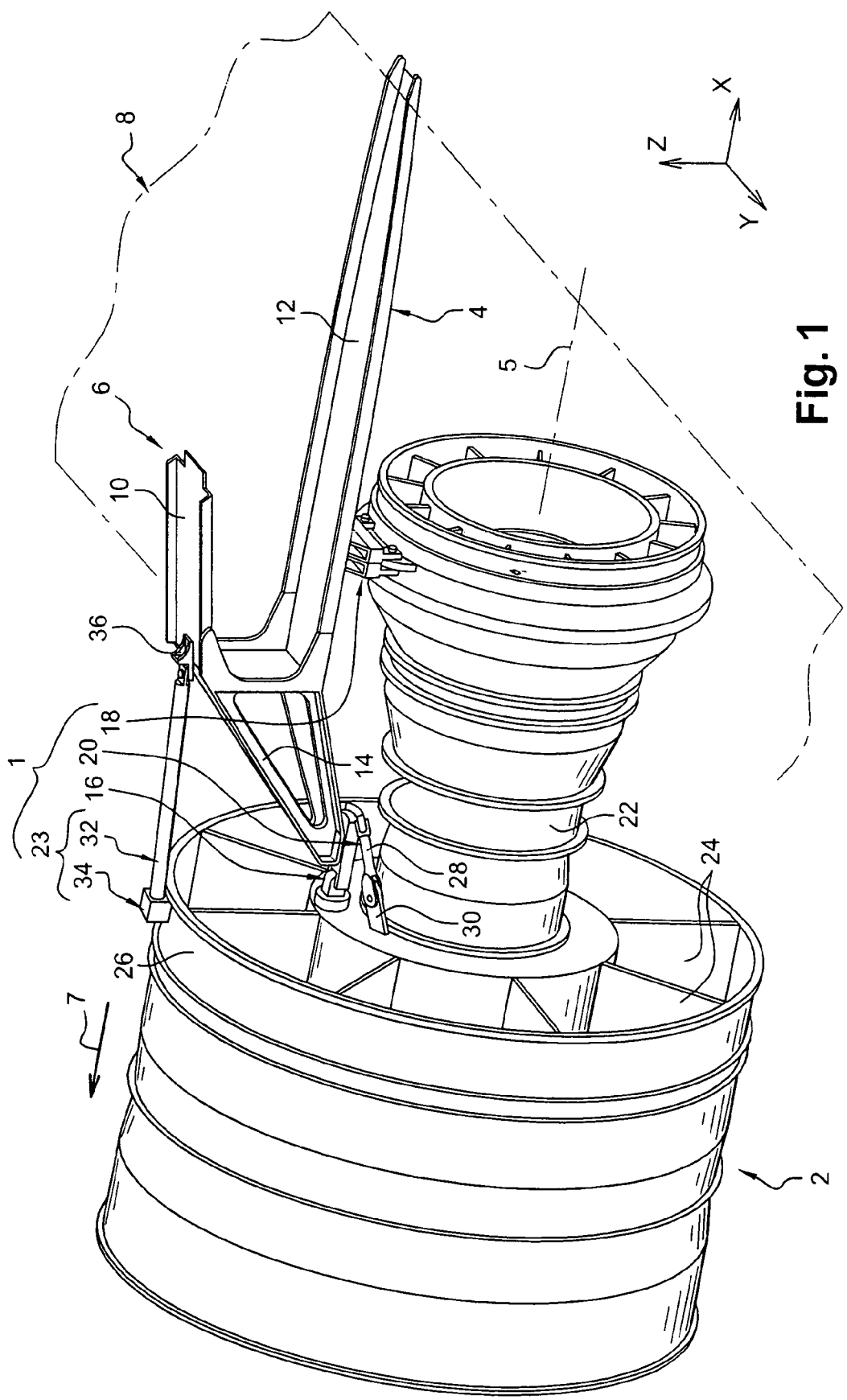
FIG. 1 shows a perspective view of a mounting system inserted between an aircraft engine and a rigid structure of an attachment strut fixed under a wing of this aircraft, according to a first preferred embodiment of this invention.

FIG. 1 shows a mounting system 1 according to a first preferred embodiment of this invention, this mounting system 1 being inserted between an aircraft engine 2 and a rigid structure 4 of an attachment strut 6 fixed under an aircraft wing shown only diagrammatically for obvious reasons of clarity, and denoted generally by the numeric reference 8. Note that the mounting system 1 shown on this FIG. 1 is adapted to cooperate with a turbojet 2, but obviously it could be a system designed to suspend any other type of engine such as a turboprop, without departing from the scope of the invention.

Throughout the description given below, by convention, X is the direction parallel to a longitudinal axis 5 of the engine 2, Y is the transverse direction of the aircraft, and Z is the vertical direction, these three directions being orthogonal to each other.

Secondly, the terms <<forward>> and <<aft>> should be considered with respect to a direction of movement of the aircraft that takes place as a result of the thrust applied by the engines 2, this direction being shown diagrammatically by the arrow 7.

Only one portion of the rigid structure 4 of the attachment strut 6 is shown on FIG. 1, obviously accompanied by the mounting system 1 forming an integral part of this strut 6, this strut also being one purpose of this invention.

The other component elements of this strut 6 that are not shown, such as the attachment means of the rigid structure 4 under aircraft wing 8, or the secondary structure segregating and maintaining systems while supporting aerodynamic fairings, are conventional elements identical to or similar to those encountered in prior art, and known to those skilled in the art. Consequently, they will not be described in detail herein.

In a known manner, it is indicated that the rigid structure 4 is globally made by the assembly of lower stringers 12 and upper stringers 10 connected to each other through several transverse ribs (not shown). Furthermore, a forward part of this rigid structure 4 is composed of a pyramid 14, also known to those skilled in the art and therefore in the form of a structure starting from a base and extending towards a vertex in the forward direction, getting closer to the longitudinal axis 5 of the engine 2.

In the first preferred embodiment of this invention shown on FIG. 1, the mounting system comprises firstly a forward mount 16, an aft mount 18, a thrust resistance device 20 resisting thrusts generated by the engine 2, and additional means 23 designed to resist longitudinal bending of the engine 2, these additional means being designed to be stressed only from a predetermined deformation of this engine 2. In this respect, note that the forward mount 16 and the aft mount 18 are conventional and are known to those skilled in the art. Consequently, they are described ere briefly for information only and not in any way imitatively.

The forward mount 16 is fixed firstly to a forward end of the pyramid 14 of the rigid structure 4, in other words its vertex, and secondly fixed to a forward part of a central casing 22 of the engine 2. More precisely, the forward mount 16 penetrates into a portion of the central casing 22 on which fixed blades 24 are fitted connecting a fan casing 26 of the engine 2 to this same central casing 22.

This forward mount 16 comprises generally a ball joint (not shown), also called a <<monoball>>, that penetrates inside the central casing 22 to resist forces along the vertical Z direction and along the transverse Y direction.

Furthermore, the aft mount 18 is firstly fixed to an aft part of the central casing 22, and secondly to a lower stringer 12 of the rigid structure 4 of the strut 6. The conventional aft mount 18 shown on FIG. 1 is composed globally of devises and fittings, and resists forces along the Y and Z directions, and resists the moment applied about the X direction.

In this first preferred embodiment of the present invention, the device 20 resisting thrusts generated by the engine 2 in this case is made using two short connecting rods 28 (only one being shown on FIG. 1) arranged on each side of the central casing 22, symmetrically about a vertical plane passing through the longitudinal axis 5 of the engine 2. Each of these two connecting rods 28 is connected firstly to the forward mount 16, for example through a spreader beam (not referenced) and secondly connected to the forward part of the central casing 22 by means of fittings 30. Naturally, it would also have been possible to provide a thrust resistance device including long connecting rods, namely no longer connected to the forward mount 16, but instead to the aft mount 18.

Note that this thrust resistance device 20 limits longitudinal bending of the engine 2 resulting from a torque about the transverse axis caused by thrusts, in a known manner and for information. Thus, during aircraft cruising phases in which longitudinal bending of an engine 2 is exclusively due to thrusts, the connecting rods 28 are mechanically stressed and limit the longitudinal deformation of this engine 2.

As will become clearer afterwards, this limited longitudinal deformation observed during the cruising phases is less than a predetermined deformation starting from which additional connecting rods will be loaded so as to form a second force path, the function of which is to oppose longitudinal bending of the engine 2.

Effectively, the special feature of this first preferred embodiment is due to the fact that the additional means 23 comprise a connecting rod 32, capable of resisting longitudinal bending of the engine 2 when it reaches the predetermined deformation, translating the fact that the aircraft is in a take off or similar phase and no longer in a cruising phase. Nevertheless, this connecting rod 32 is naturally inactive during cruising phases of the aircraft, namely when the longitudinal bending of the engine 2 is small, so that the mounting system 1 can remain statically determinate throughout the cruising phase.

In this respect, note that the first force path, consisting of elements 16, 18 and 20 in the mounting system 1, is naturally perfectly capable of resisting forces transmitted during deformations of the engine 2, up to at least the predetermined deformation.

Still with reference to FIG. 1, the connecting rod 32 has a forward end connected to an aft upper part of the fan casing 26, and more precisely to an aft part of this casing 26, at an upper and outer end portion of the casing. Furthermore, this connecting rod 32 is also provided with an aft end connected to the rigid structure 4 of the strut 6, preferably on a forward part of an upper stringer 10, at a junction between the pyramid 14 and the remaining part of the rigid structure 4 as is clearly shown on FIG. 1. In this manner, the connecting rod 32 is preferably located in the vertical fictitious plane passing through the longitudinal axis 5 of the engine 2, and is approximately oriented along the longitudinal X direction. Generally, the connecting rod 32 can be placed along the prolongation of the upper stringer 10, namely in a plane defined by this stringer.

The additional means 23 also comprise a soft mount 34 inserted between the fan casing 26 and the forward end of this same connecting rod 32, so that the connecting rod 32 is only mechanically stressed when the engine 2 has reached the predetermined deformation, and not during cruising phases. On the other hand, the aft end of the rod 32 is simply mounted on a fitting 36 fixed to the upper stringer 10 of the rigid structure 4, for example using a ball joint (not referenced).

Obviously, it would also be possible to provide a soft mount between the aft end of the connecting rod 32 and the rigid structure 4, or only at this location and no longer at the forward end, without departing from the scope of the invention.

Figure 2A:
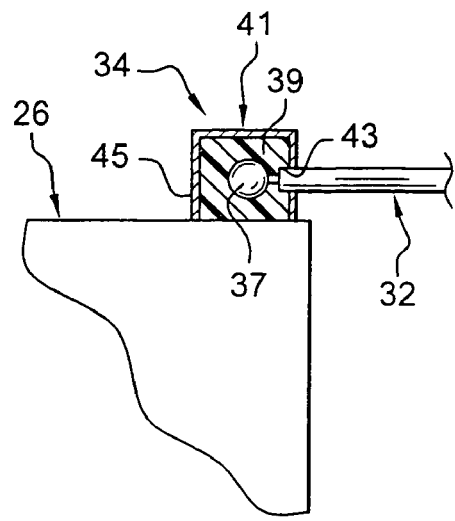
FIG. 2a shows a partial lateral view of the mounting system in FIG. 1, when no longitudinal bending is applied to the engine.

More specifically, FIG. 2a shows the soft mount 34 when the engine 2 is not subjected to longitudinal bending. In this case, it can be seen that the forward end of the connecting rod 32, preferably ball shaped, is embedded in an elastic material 39 such as rubber, this material 39 filling a space delimited by a rigid hollow body 41 fixed to the fan casing 26, the hollow body 41 for example being in the form of a cube. Furthermore, as can be seen on this FIG. 2a, the connecting rod 32 passes through the body 41 at an opening 43 in the body so as to enable relative movement between the forward end of the connecting rod 32 and the rigid hollow body 41 of the soft mount 34. As appears obvious from the above, the body 41 is precisely located on the aft part of the fan casing 26, at an upper and outer end portion of the fan casing.

Figure 2B:
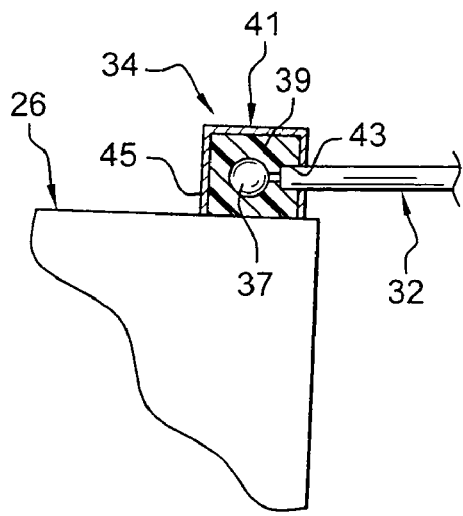
FIG. 2b shows a partial lateral view of the mounting system in FIG. 1, when slight longitudinal bending is applied to the engine due to applied thrusts during a cruising phase.

With reference to FIG. 2b diagrammatically showing a state in which the aircraft is in a cruising phase, and therefore in which slight longitudinal bending is applied to the engine 2 as a result of thrusts, it can be seen that the slight inclination of the fan casing 26 means that the connecting rod 32 will penetrate slightly further into the soft mount 34, towards a forward wall 45 of the rigid hollow body 41 fixed to this casing 26. Naturally, this displacement of the connecting rod 32 with respect to the body 41 is accompanied by deformation of the elastic material 39. In this configuration in FIG. 2b, the connecting rod 32 is still not stressed mechanically because the elastic material 39 can deform more, but simply moves inside its associated mount 34.

Figure 2C:
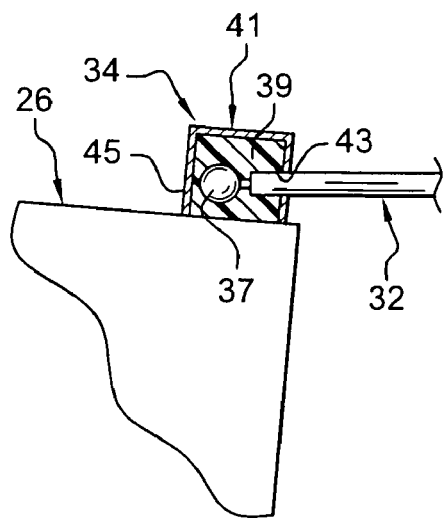
FIG. 2c shows a partial lateral view of the mounting system in FIG. 1, when a significant longitudinal bending is applied to the engine, particularly due to the aerodynamic thrust applied during a takeoff or similar phase.

We will now refer to FIG. 2c that diagrammatically represents a state in which the aircraft is in a take off or similar phase, and therefore in which the engine 2 is subjected to non-negligible longitudinal bending corresponding to the above-mentioned predetermined deformation, it can be seen that the significant inclination of the fan casing 26 causes the connecting rod 32 to penetrate the maximum distance into the soft mount 34 towards the forward wall 45 of the body 41. In other words, the elastic material 39 trapped inside the body 41 cannot deform any further, such that starting from this predetermined deformation of the engine 2 and for higher deformations, the connecting rod 32 will in fact be stressed mechanically so as to form the second force path additional to the first force path mentioned above.

Figure 3:
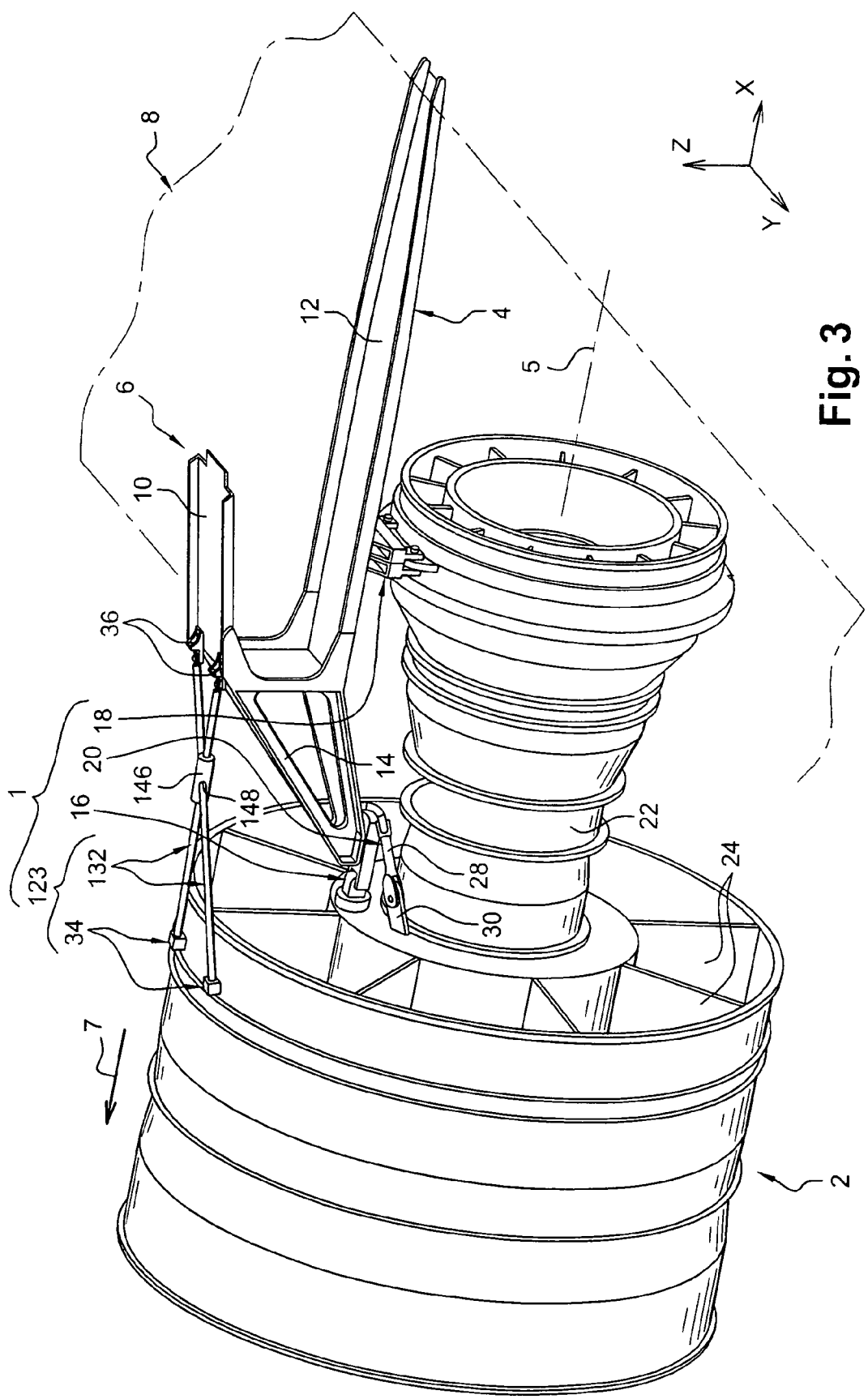
FIG. 3 shows a perspective view of a mounting system inserted between an aircraft engine and a rigid structure of an attachment strut fixed under a wing of this aircraft, according to an alternative to the first preferred embodiment of this invention.

FIG. 3 shows a mounting system 1 according to an alternative of the first preferred embodiment of this invention.

It can be seen that in this alternative, only the additional means 123 designed to oppose longitudinal bending of the engine 2 starting from a deformation of the engine, are different from the means 23 proposed in the embodiment described with reference to FIG. 1.

The additional means 123 no longer contain only one connecting rod 32, but two connecting rods 132 in which the forward ends are also connected to the corresponding aft upper part of the fan casing 26 through two soft mounts 34, and for which the corresponding aft ends are also connected to the rigid structure 4 through two fittings 36, preferably on a forward part of an upper stringer 10 at a junction between the pyramid 14 and the remainder of the rigid structure 4 as clearly shown on FIG. 3.

The two connecting rods 132 are then preferably located in an approximately horizontal plane and arranged symmetrically about the vertical plane passing through the longitudinal axis 5 of the engine 2. Once again, in general, it could be arranged that the two rods 132 are located in a plane defined by the upper stringer 10.

Furthermore, as can clearly be seen on FIG. 3, the two connecting rods 132 may be placed so as to form a cross. To achieve this, one of the two connecting rods 132 is then provided with a reinforced portion 146 approximately in the center, with a large diameter, through which a through hole 148 is drilled, allowing the other of the two connecting rods 132 to pass through.

Figure 4:
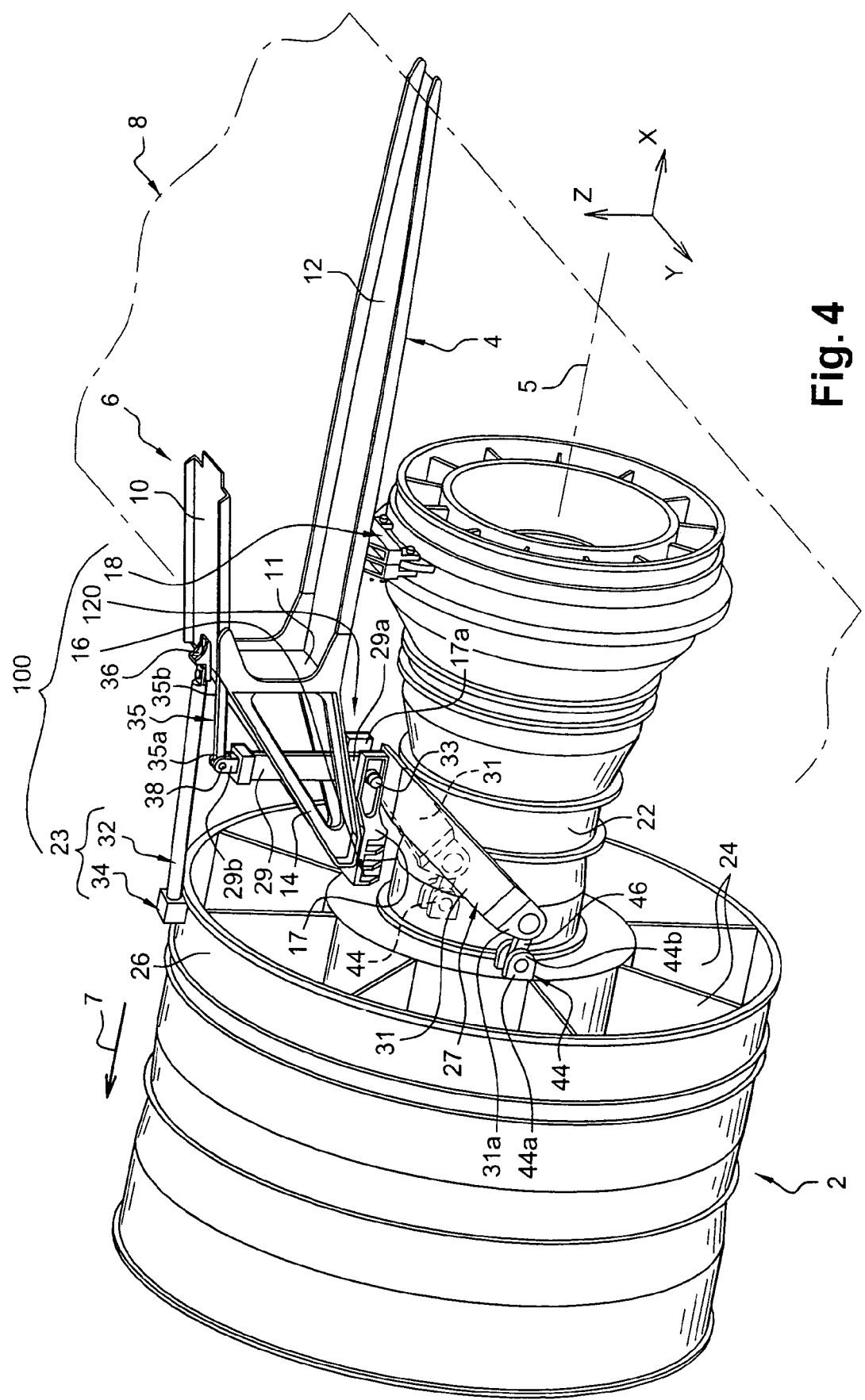
FIG. 4 shows a perspective view of a mounting system inserted between an aircraft engine and a rigid structure of an attachment strut fixed under a wing of this aircraft, according to a second preferred embodiment of this invention.

With reference now to FIG. 4, the figure shows a mounting system 100 according to a second preferred embodiment of this invention, this mounting system 100 including the additional means 23 described above. Naturally, in this second preferred embodiment, it is noted that the additional means 23 could be replaced by additional means 123 corresponding to the alternative described with reference to FIG. 3 without departing from the scope of the invention.

The special feature of this second preferred embodiment is due to the fact that the mounting system 100 comprises a first thrust resistance device 120 designed to completely cancel out the longitudinal bending of the engine 2 resulting from a torque about the transverse axis related to these thrusts. Thus, during cruising phases of the aircraft in which longitudinal bending of the engine 2 is normally exclusively due to thrusts, there is no longitudinal deformation of this engine 2. Since there is no longitudinal bending of the engine 2 during the cruising phases, the predetermined deformation of the engine 2 that will be adjusted by iterative calculations and beyond which the additional means 23 form a second force path opposing longitudinal bending, can be significantly lower than is the case in the first preferred embodiment.

It is recommended that a vertical XY plane passing through the longitudinal axis 5 of the engine 2 should form a plane of symmetry for the thrust resistance device 120.

As can be seen clearly on FIG. 4, this device 120 comprises mainly a spreader beam 27 globally in the form of a fork, and therefore comprising three arms 29,31 fixed to each other. Among these three arms, there is firstly an upper arm 29 along the vertical direction Z perpendicular to the longitudinal axis 5 of the engine 2. Consequently, this upper arm 29 is straight and is arranged in the vertical XY plane passing through the longitudinal axis 5 above the central casing 22.

Furthermore, there are also two lateral lower arms 31, symmetric about the vertical XZ plane passing through the longitudinal axis 5 of the engine 2, and being curved so that they can be correctly arranged around the central casing 22. Furthermore, the distance between these lower arms 31 and a horizontal XY plane passing through the longitudinal axis 5 increases in the aft direction as can be seen on FIG. 4. Thus, the two lower arms 31 extend downwards at least as far as the horizontal XY plane passing through the longitudinal axis 5, and upwards as far as the vertical XY plane passing through this same axis. In this respect, they generally form a half-ring located in a plane inclined from the longitudinal X and vertical Z directions, and not inclined with respect to the transverse Y direction.

As an example, the spreader beam 27 may be made using two parts one fixed to each other and symmetric about the vertical XZ plane passing through the axis 5.

To make the junction between the spreader beam 27 and the forward mount 16, a forward mount body 17 of this forward mount comprises a doubled headed aft end 17a in which each of the heads (not referenced) extends along a longitudinal X direction and between which a lower end 29a of the upper arm 29 is located.

In this way, a swivel pin 33 or a ball joint, oriented along the transverse Y direction, passes through the two heads of the aft end 17a and the lower end 29a cooperating with a ball joint in pin 33, these elements 17a and 29a obviously being provided with orifices necessary for such a mounting system.

Furthermore, the upper arm 29 also comprises a double headed upper end 29b in which each of the heads (not referenced) extends along the vertical Z direction, and between which a forward end 35a of a connecting rod 35 is formed setting up a swivel joint between the rigid structure 4 and the spreader beam 27. For guidance, note that this end 29b also forms the top end of the spreader beam 27.

In this way, a swivel pin 38 or a ball joint oriented along the transverse Y direction passes through the two heads of the upper end 29b and the forward end 35a cooperating with a ball joint of the hinge pin 38, these elements 29b and 35a obviously being also provided with orifices enabling such a mounting.

The connecting rod 35 extends approximately along the longitudinal X direction as far as an aft end 35b located between the two heads of a doubled headed fitting (not shown), fixed to the base of the pyramid 14 of the rigid structure 4. In other words, the aft end 35b is connected to the base of the pyramid 14, which is formed by a transverse rib 11 located as far forward as possible from the rigid structure 4. Once again, a swivel pin oriented along the Y direction can be provided passing through the two heads of the fitting along the longitudinal X direction, and the aft end 35b of the connecting rod 35.

Naturally, the connecting rod 35 may extend along any other direction than the X direction, and is preferably arranged parallel to and below the connecting rod 32 of the additional means 23, this connecting rod 32 preferably being parallel to the upper stringer 10.

As can be seen on FIG. 4, the upper arm 29 passes through this pyramid 14, which advantageously contributes to obtaining a compact mounting system 1.

Concerning the lateral lower arms 31 and their associated elements that will be presented below, note that only one of these two arms 31 will be described in full, since they are identical and symmetric about the vertical fictitious XZ plane passing through the longitudinal axis 5.

Thus, each arm 31 comprises a lower end 31a located in the horizontal fictitious XY plane passing through the longitudinal axis 5, and in other words this same plane passes through it so that thrusts can be resisted at the location at which they are created. Also for information, note that this end 31a also forms a lateral lower end of the spreader beam 27.

A fitting 44, preferably a double headed fitting, is associated with the arm 31 and extends along the longitudinal direction X. This fitting 44 comprises a forward end 44a contained in the horizontal XY plane passing through the axis 5, and being fixed to the forward part of the central casing 22. It also comprises an aft end 44b connected to the lateral lower end 31a of the arm 31, this aft end 44b consequently also defining the horizontal XY plane passing through the axis 5.

In this second preferred embodiment described, the junction between the aft end 44b of the double-headed fitting 44 is connected to the lateral lower end 31a of the arm 31 using a connecting rod 46, extending along the X direction in the horizontal XY plane passing through the axis 5. Consequently, the connecting rod 46 may for example be mounted articulated between the two heads (not referenced) of the aft end 44b of the fitting 44, and also mounted articulated onto the lateral lower end 31a of the arm 31.

However, if the connecting rod solution is preferred, it would also have been possible to use clevises or any other similar solution without departing from the scope of the invention.

Thus with this configuration, during cruising phases of the aircraft and due to the high thrusts generated by the engine 2, the two lateral lower ends 31a resist two forward axial forces along the X direction. Furthermore, the lower end 29a of the upper arm 29 resists an axial force in the aft direction along the X direction, while the upper end 29b of this upper arm 29 resists a forward axial force along the same direction. Thus, these axial forces are such that the moment about the transverse axis related to thrusts and applied to the engine 2 is zero, such that the engine is no longer subjected to any longitudinal bending during cruising phases.

Now with reference to FIGS. 5 to 8, the figures show a mounting system 200 according to a third preferred embodiment of this invention, this mounting system 200 including the additional means 23 described above. Once again, the additional means 23 could be replaced by additional means 123 corresponding to the alternative described with reference to FIG. 3, without departing from the scope of the invention.

As in the second preferred embodiment, the special feature of this third preferred embodiment is due to the fact that the mounting system 200 comprises a thrust resistance device 220 designed to completely cancel out the longitudinal bending of the engine 2 resulting from a torque about the transverse axis related to these thrusts. Thus, during the aircraft cruising phases in which the longitudinal bending of the engine 2 is normally exclusively caused by thrusts, there is no longitudinal deformation of this engine 2.

As described above, the forward mount 16 is firstly fixed to the forward end of the pyramid 14 of the rigid structure 4, in other words its vertex, and secondly fixed to the forward part of a central casing 22 of the engine 2. More precisely, in this third preferred embodiment, the forward mount 16 penetrates into an upper radial portion 21 of the central casing 22 located close to and behind the fixed vanes 24, this portion 21 being additional to the central casing 22 in FIGS. 1 to 4.

Figure 5:
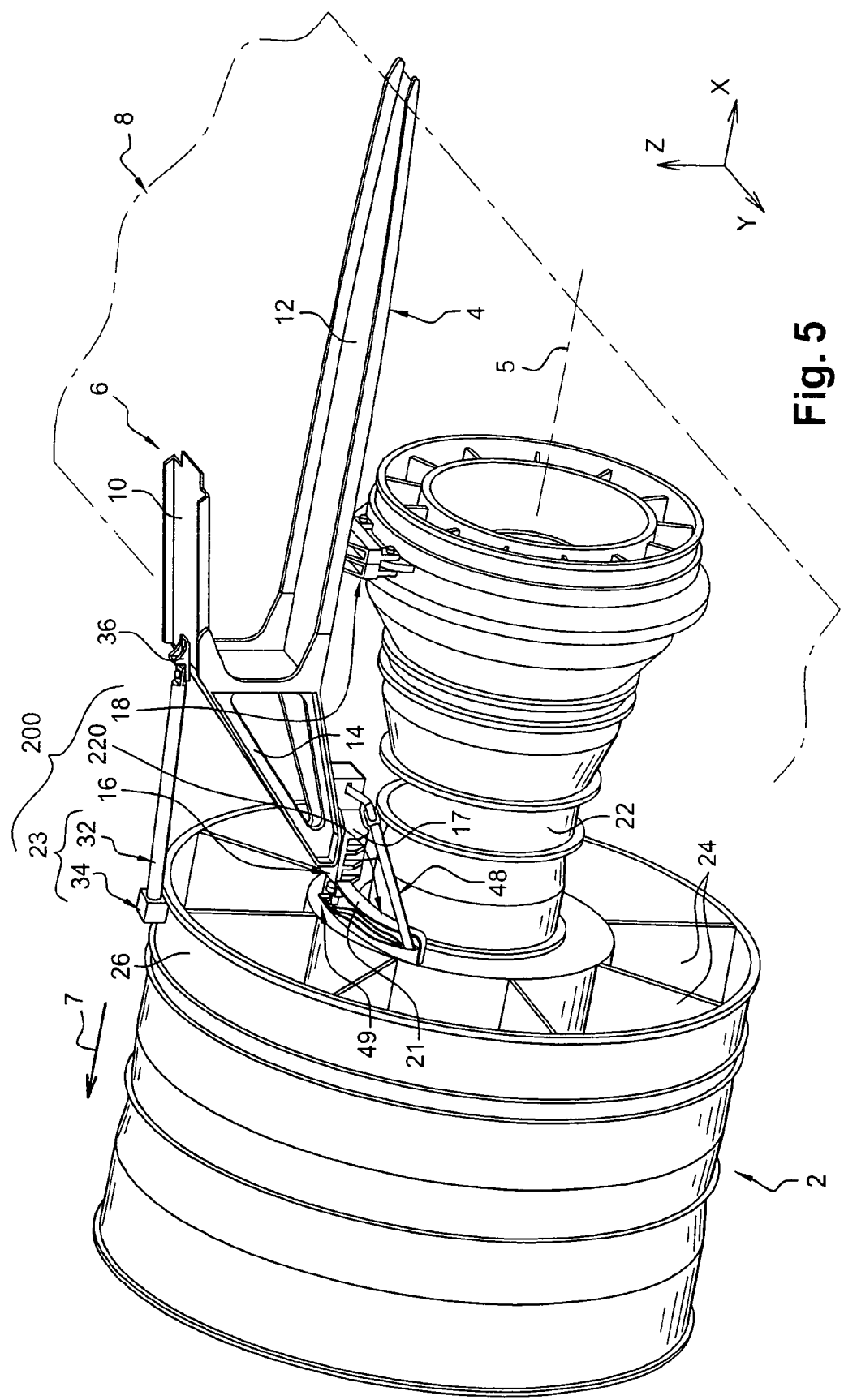
FIG. 5 shows a perspective view of a mounting system inserted between an aircraft engine and a rigid structure of an attachment strut fixed under a wing of this aircraft, according to a third preferred embodiment of this invention.

Furthermore, on FIG. 5, it can be seen that the upper radial portion 21 located at the forward part of the central casing 22 and shown in a cutout manner for reasons of clarity, extends radially outwards from a part of the casing 22 further in the aft direction, and for example extends around an angular sector of about 90°.

Note that a vertical XY plane passing through the longitudinal axis 5 of the engine 2 forms a plane of symmetry for the thrust resistance device 220.

As can be seen on FIG. 5, this device 220 comprises mainly two lateral actuators 48 (only one being shown) arranged on each side of the central casing 22, and a hydraulic piston device 49 globally along the forward prolongation of the forward mount 16, adjacent to the ball joint 19.

Figure 6:
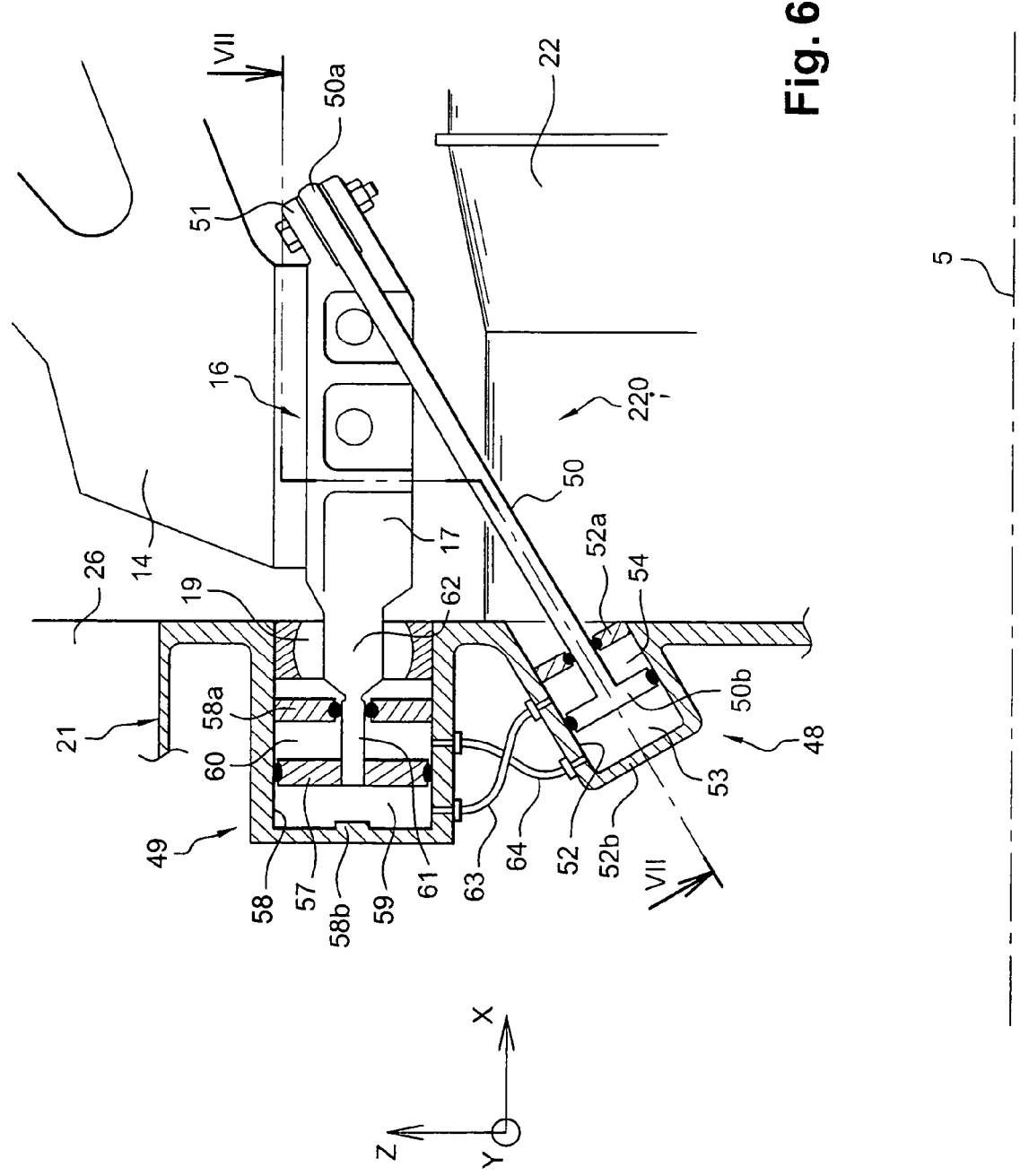
FIG. 6 shows a partial side view of FIG. 5.
Figure 7:
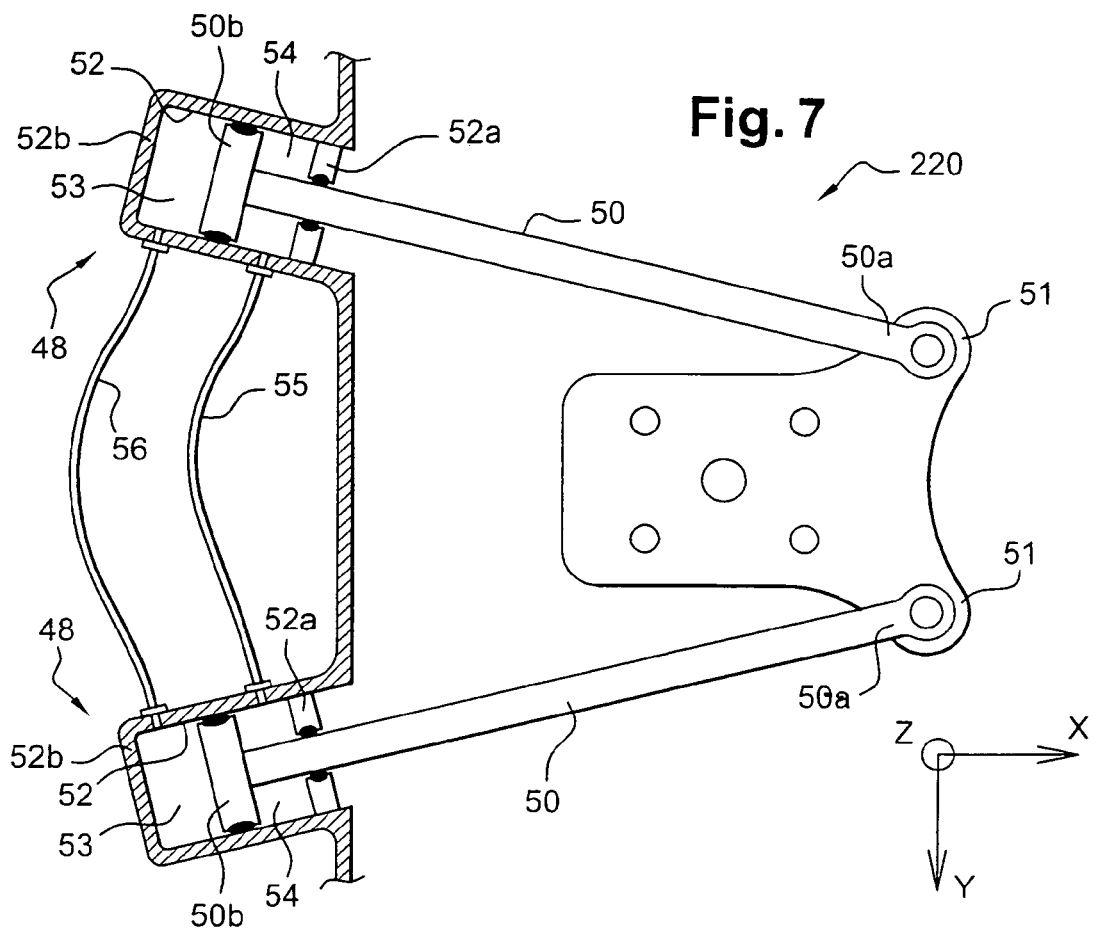
FIG. 7 shows a sectional view taken along line VII—VII on FIG. 6.

With reference more specifically to FIGS. 6 and 7, it can be seen that each of the lateral actuators 48 which are preferably identical and therefore arranged symmetrically about the XZ plane passing through the axis 5, has a rod 50 such that the distance between this rod and the XZ plane reduces towards the top and towards the aft direction. An aft end 50a of the rod 50 is mounted on a double headed lug 51 located at an aft end of the body 17 of the forward mount 16. Thus, the aft end 50a may be mounted hinged between the two heads of the lug 51, for example by means of a ball joint or a hinge pin (not referenced).

The rod 50 also includes a forward end 50b in the form of a piston located inside a chamber 52 in which this piston 50b can be moved, the chamber 52 preferably being made directly inside the upper portion 21 of the forward part of the central casing 22. This chamber 52 then comprises a forward compartment 53 and an aft compartment 54 separated by the piston 50b, in which a fluid such as oil is located. In the same way as the piston 50b, the chamber 52 is then preferably cylindrical with a circular section, and comprises a cylindrical aft wall 52a through which the rod 50 passes perpendicularly in a sealed manner, and a forward cylindrical wall 52b parallel to wall 52a and to piston 50b.

With reference more particularly to FIG. 7, it can be seen that the aft compartments 54 are hydraulically connected, for example using flexible pipes 55. Consequently, when the engine 2 applies thrust forces, the hydraulic connection made ensures that the oil pressure will increase identically in the two aft compartments 54, such that the forces resisted by the two rods 50 and transmitted to the forward mount 6 are also approximately the same.

Similarly, the forward compartments 53 are also hydraulically connected, always using flexible pipes 56. Thus, the horizontal spreader beam effect achieved by the lateral actuators 48 may also be achieved when the engine 2 is operating in reverse thrust mode.

Once again with reference to FIG. 6, it can be seen that the hydraulic piston device 49 comprises a piston 57 located inside a chamber 58 in which this piston 57 can move, the chamber 58 preferably being made directly inside the upper portion 21 of the forward part of the central casing 22. This chamber 58 then comprises a forward compartment 59 and an aft compartment 60 separated by the piston 57, and in which there is a fluid identical to the fluid in the chambers 52. In the same way as the piston 57, the chamber 58 is then preferably cylindrical with a circular section and comprises an aft cylindrical wall 58a through which a piston rod 61 passes perpendicular and in a sealed manner, together with a forward cylindrical wall 58b parallel to the wall 58a and the piston 57.

Furthermore, with reference to the vertical Z direction and considering a side view of the thrust resistance device 220, it can be seen that the piston 57 of the device 49 is located above the pistons 50b of the actuators 48. Thus, still with reference to the same view, the forces applied by the fluid pressure in chamber 58 are higher than the forces applied by the fluid pressure in the chambers 52.

In this third preferred embodiment of the present invention, the ball joint 19 of the forward mount 16 is mounted on a hinge pin 62 oriented along the X direction, this hinge pin 62 itself being fixed to the body 17 of the mount 16. In this respect, the piston 57 is mounted fixed onto the hinge pin 62 through the piston rod 61 arranged along the prolongation of the piston, and is located forward from this hinge pin 62, approximately perpendicular to the X direction.

In other words, the piston 57 is preferably capable of moving along the X direction inside the chamber 58, unlike the pistons 50b of the actuators 48 that can be moved along the directions of the associated rods 50, namely along directions such that the distance of the axis 5 from the XZ plane reduces towards the aft direction and upwards.

As will be described in more detail below, in order to cancel out the torque about the transverse axis applied to the engine 2 related to the thrusts, the forward compartment 59 of the chamber 58 is hydraulically connected to the two aft compartments 54 of the chamber 52, preferably using flexible pipes 63. In this way, the fluid pressure inside the forward compartment 59 is approximately identical to the fluid pressure inside the aft compartments 54 at all times.

Note also that in order to obtain the same effect canceling out the torque about the transverse axis when the engine 2 is operating in reverse thrust mode, flexible pipes 64 are provided to hydraulically connect the aft compartment 60 of the chamber 58 and the two forward compartments 53 of the chambers 52.

Figure 8:
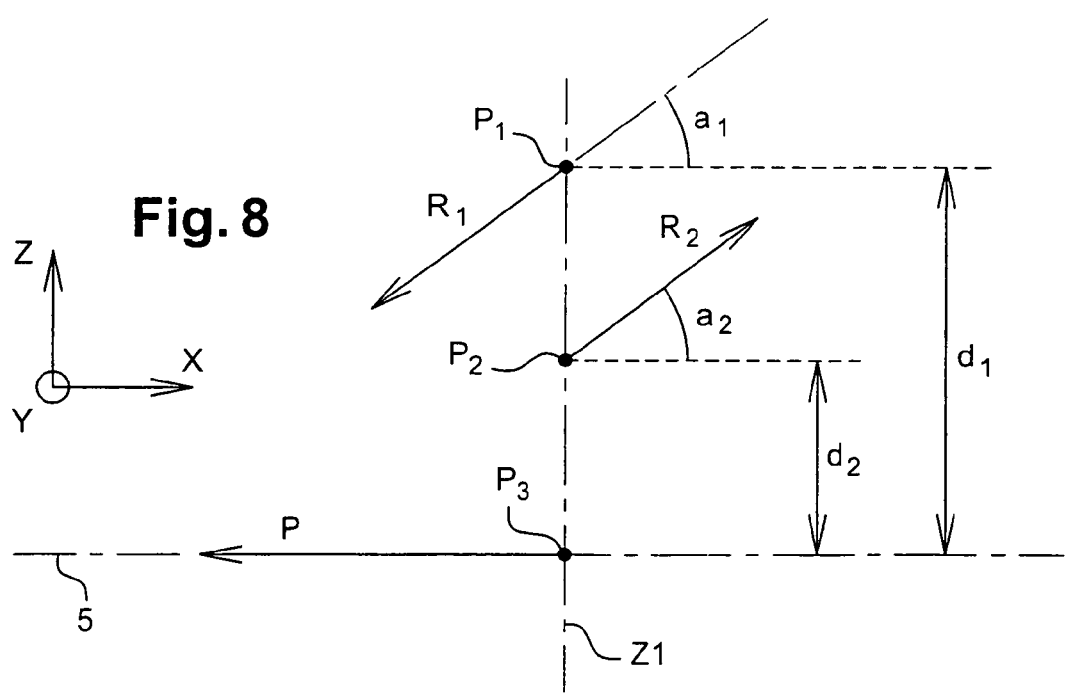
FIG. 8 shows a force diagram showing all forces applied on the engine, used in association with the thrust resistance device in FIG. 5 when the aircraft is in a cruising phase.

FIG. 8 shows a force diagram demonstrating that the torque about the transverse axis applied to the engine 2 during cruising phases can be cancelled out, by judiciously dimensioning the actuators 48 and the hydraulic piston device 49.

Firstly, this diagram shows the projection of the various forces onto the vertical XY plane passing through the axis 5, and it can be seen that thrusts symbolized by the arrow P are present, and these forces act forwards along the X direction.

Furthermore, the arrow R1 symbolizes pressure forces applied by the fluid contained in the chamber 58 of the device 49, and the arrow R2 symbolizes the sum of pressure forces applied by the fluid contained in the two chambers 52 of the lateral actuators 48.

These forces R1 and R2 are oriented in the aft and forward directions respectively, at angles a1 and a2 from the X direction. Note that the opposite direction of the forces R1 and R2 is obtained simply by making the hydraulic connection described above, namely the connection between firstly the forward compartment 59 of the chamber 58, and secondly the aft compartments 54 of the two chambers 52.

For guidance, note that the angle a1 is zero in the case of the first preferred embodiment shown on FIGS. 5 to 7. Furthermore, the application points P1 and P2 of the forces R1 and R2 are at distances d1 and d2 respectively from the axis 5 along a vertical line Z1 also passing through a point P3 corresponding to the application point of the thrusts. Naturally, it should be understood that the vertical position of points P1 and P2 with respect to point P3 and the value of angles a1 and a2 depend on the global geometry of the thrust resistance device 220.

Consequently, all that is necessary for the torque about the transverse axis applied to the engine 2 to be cancelled out, is for the values of the three forces involved P, R1 and R2 to satisfy the following system of equations, in which equation (a) corresponds to the sum of moments applied to point P3, and for which equation (b) corresponds to the sum of moments applied to point P1:

$$R1.\cos(a1).d1 - R2.\cos(a2).d2 = 0 \quad (a)$$

$$R2.\cos(a2).(d1-d2) = P.d1 \quad (b)$$

Therefore, this equation system clearly shows that the ratio between R1 and R2 is constant, independent of P, and is related only to the global geometry of the thrust resistance device 220.

The ratio mentioned above satisfies the following equation (c);

$$R2/R1 = (\cos(a1).d1)/(\cos(a2).d2) \quad (c)$$

Consequently and as indicated above, it is sufficient to size the actuators 48 and the device 49 such that a ratio k corresponding to R1/R2 satisfies equation (c), to cancel out the torque about the transverse axis applied to the engine 2, regardless of the value of the thrusts during cruising phases.

In this respect, if Φ1 is the diameter of the piston 57 and Φ2 is the diameter of each of the two pistons 50b, then the values of these diameters will be chosen such that they satisfy the following equation (d):

$$\Phi 2 = \Phi 1.\sqrt{(k/2)} \quad (d)$$

Obviously, it can be seen that when the diameters Φ2 and Φ1 satisfy equation (d), they also result in the torque about the transverse axis being cancelled out when the engine operates in reverse thrust mode, particularly due to flexible pipes 64 hydraulically connecting firstly the aft compartment 60 of the chamber 58, and secondly the forward compartments 53 of the two chambers 52.

In this third preferred embodiment, the forward compartment 59 of the chamber 58 is hydraulically connected only to the aft compartments 54 of the actuators 48, and each of the two aft compartments 54 of the chamber 52 is hydraulically connected only to the forward compartment 59 of the chamber 58. In other words, the forward compartment 59, the aft compartments 54 and the flexible pipes 63 together form a closed assembly inside which fluid can circulate freely. Furthermore, no external fluid can enter this assembly except during filling and draining operations of elements 59, 54 and 63, and the fluid contained in it cannot escape from it.

Note also that properties related to the assembly 59, 54, 63 that has just been described are preferably also valid for the assembly composed of the aft compartment 60, the forward compartments 53 and the flexible pipes 64.

Thus, when the aircraft is in a cruising phase and the engine 2 applies thrust forces P, the fluid pressure inside the two aft compartments 54 will increase until it reaches the value <<Vp>> necessary to resist these forces P, this value being the same in the two compartments 54 due to the hydraulic connection made. The pressure increase is due to compression of the fluid, which generates forces R2 on the aft wall 52a of the chambers 52.

At the same time, the fluid inside the forward compartment 59 is at the same pressure <<Vp>> as the fluid inside the aft compartments 54, also due to the hydraulic connections made. In this way, the fluid present in the forward compartment 59 generates forces R1 on the forward wall 58b of the chamber 58. And as mentioned above, the geometry and the size of the thrust resistance device 220 are such that these forces R1 resulting from the pressure <<Vp>> are such that they resist the thrust forces P. -and at the same time they also cancel out the torque about the transverse axis due to forces R2.

Finally, note that in this third preferred embodiment of the present invention, the measurement of the difference in fluid pressure between the forward and aft compartments of one of the chambers 52, 58 can be used to determine the pressure forces applied by the engine 2, due to the proportionality relation between these data.

Figure 9:
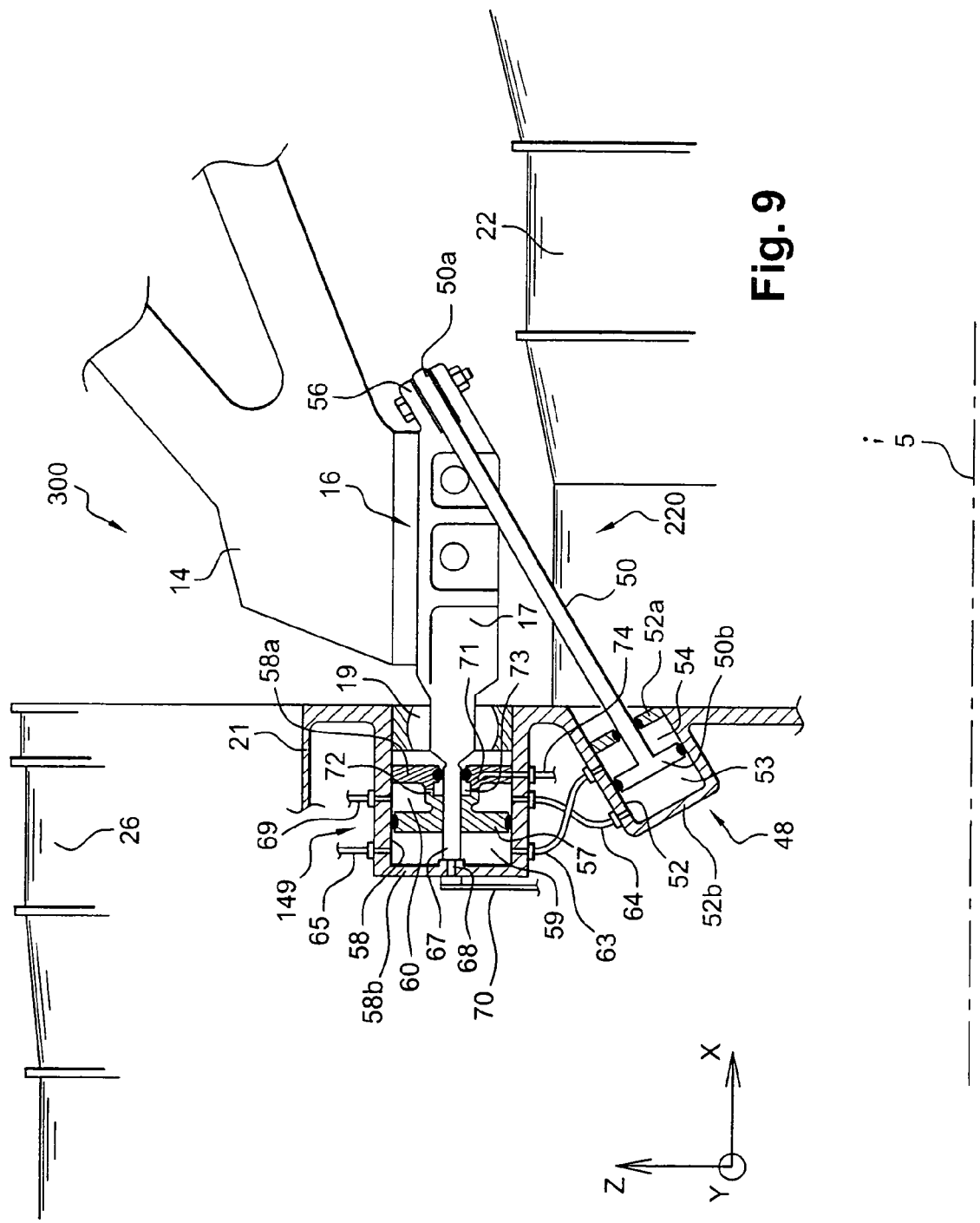
FIG. 9 shows a view similar to that in FIG. 6, when the mounting system inserted between an aircraft engine and a rigid structure of an attachment strut fixed under a wing of this aircraft is made according to a fourth preferred embodiment of this invention.

FIG. 9 shows a mounting system 300 according to a fourth preferred embodiment of this invention, this mounting system 300 being similar to the mounting system 200 in the third preferred embodiment described above.

It can be seen that in this fourth preferred embodiment of the invention, only the hydraulic piston device 149 is different from the device 49 in the third preferred embodiment.

The device 149 includes all elements of the device 49 and also includes other additional elements which will now be described.

The forward compartment 59 is hydraulically connected to the aft compartments 54, but also to a high pressure hydraulic supply 65. This supply 65 continuously supplies the forward compartment 59 with fluid at a pressure greater than the pressure used to resist maximum thrust forces that the engine 2 can generate.

Furthermore, the forward compartment 59 is provided with a leak orifice 68, for example located on the forward wall 58b of the chamber 58, and for which access can be enabled/disabled by a device 67 fixed to the piston 57. This device 67, facing the leak orifice 68, can expose or close off this orifice 68, firstly by breaking the contact with the forward wall 58b and coming into contact with this same wall, and as a function of the position of the piston 57 in the chamber 58. In other words, access to the leak orifice 68 is enabled/disabled by the device 67 as a function of the hydraulic pressure inside the forward compartment 59, and as a function of thrust forces generated by the engine 2. Preferably, and as can be seen on FIG. 9, the device 67 may be in the form of a hinge pin centered with respect to piston 57 and located forward from the piston.

Thus, during operation, the high fluid pressure output by the supply 65 implies that the piston 57 will move in the aft direction carrying the device 67 with it, which then exposes the leak orifice 68. Therefore some of the fluid will exit from the compartment 59 through this orifice 68, and then will move towards a leakage circuit 70 that is preferably hydraulically connected to the high pressure supply 65. Consequently, releasing the leak orifice 68 simultaneously reduces the fluid pressure inside the compartment 59 which becomes very low, which makes the piston 57 return forwards. This displacement of the piston 57 in the forward direction is then stopped by the device 67 coming into contact with the forward wall 58b that once again closes off the leak orifice 68. Then, due to the presence of the high pressure supply 65 and the orifice 68 being closed off, the pressure inside the compartment 59 increases and the piston 57 then moves in the aft direction again when this pressure exceeds the pressure necessary to resist the instantaneous thrusts generated by the engine 2.

In this way, the permanent to and fro movement described by the piston 57 is such that the fluid pressure inside the compartment 59 at any time is equal to the exact pressure necessary to resist the thrusts applied at the same time. Therefore, measuring this pressure would make it possible to determine instantaneous thrusts, always making use of the proportionality relation that exists between these data.

Note that the function that has just been described can also work in reverse thrust mode.

To achieve this, in the same way as described above, the aft compartment 60 is then hydraulically connected to a high pressure hydraulic supply 69. This supply 69 continuously supplies fluid to the aft compartment 60, at a pressure greater than the pressure necessary to oppose the maximum reverse thrusts that the engine 2 can generate.

Furthermore, the compartment 60 is provided with a leak orifice 71, for example located on the aft wall 58a of the chamber 58, and for which access can be enabled/disabled by a device 72 fixed to the piston 57. As can be shown on FIG. 5, this device 72 may be in the form of a crown with an axis parallel to the X direction, which defines a closed chamber 73 when it is in contact with the wall 58a, inaccessible to the fluid contained in the aft compartment 60, this chamber 73 also communicating with the leak orifice 71. On the other hand, when the piston 57 moves forwards, the contact between the device 72 and the aft wall 58a is broken such that fluid can then penetrate in the chamber 73 and escape through the leak orifice 71 towards a leakage circuit 74, which is preferably also hydraulically connected to the high pressure supply 69, independent of the high pressure supply 65. Preferably, and as can be seen on FIG. 9, the device 72 is obviously behind the piston 57.

Note that the high pressure supplies 65 and 69 can each operate using a pump with a gear assembled on an accessories box of the engine 2, this type of pump being preferred in that it can provide very high pressures at low flow.

It is also noted that the devices 67 and 72 may advantageously fulfill the mechanical stops function in the case of a hydraulic leak, in cooperation with walls 58b and 58a of the chamber 58.

Furthermore, even if it is not shown on FIG. 9, the devices 67 and 72 are obviously not simultaneously in contact with walls 58b and 58a. An appropriate clearance is provided such that when one of the devices 67, 72 is in contact with its associated wall 58b, 58a, the other device is located at a distance from its associated wall. Consequently, when access to one of the orifices 68, 71 is disabled, access to the other orifice is enabled. In this respect, note that the defined clearance is small enough such that during assembly, the devices 67 and 72 enable good positioning of the engine 2 with respect to the strut 6 along the longitudinal X direction.

Furthermore, this clearance is such that during the to and fro movement described by piston 57 during operation of the engine 2 in normal thrust mode, access to the orifice 68 is always enabled, such that the fluid pressure existing inside the compartment 60 is always very small or even zero. Obviously, this statement is also valid for access to the orifice 71 when the engine 2 is operating in reverse thrust mode.

Finally, note that the high pressure supplies 65 and 69 and the leak orifices 68 and 71 could also have been located in one of the two chambers 52 of the lateral actuators 48, without departing from the scope of the invention.

Obviously, those skilled in the art could made various modifications to the mounting systems 1, 100, 200 and 300 and to the attachment strut 6 that have just been described as non-limitative examples only.

The invention claimed is:

1. A system comprising:
    an engine including a fan casing;
    an attachment strut fixed under a wing;
    a forward mount for mounting the engine to the attachment strut;
    an aft mount for mounting the engine to the attachment strut;
    a thrust resistance device configured to resist thrusts generated by the engine; and
    means for opposing longitudinal bending of the engine, said means configured to resist loads only starting from a predetermined deformation of the engine;
    wherein said means comprises a connecting rod capable of opposing longitudinal bending of the engine, said connecting rod being directly connected to the attachment strut and to said fan casing of the engine, so that the connecting rod is only stressed starting from the predetermined deformation of the engine.

2. A system according to claim 1, wherein the engine defines a longitudinal axis and said connecting rod is disposed parallel to the longitudinal axis of the engine.

3. A system according to claim 1, characterized in that each connecting rod is connected to at least one of the elements taken from among the group consisting of the fan casing of the engine and the rigid structure of the strut through a flexible mount.

4. A system according to claim 1, characterized in that each connecting rod is connected to an aft upper part of the fan casing of the engine.

5. A system according to claim 1, characterized in that said additional means comprise only one connecting rod for opposing the longitudinal bending of the engine.

6. A system according to claim 1, characterized in that said additional means comprise two connecting rods for opposing the longitudinal bending of the engine.

7. A system according to claim 1, characterized in that the device for resisting thrusts generated by the engine comprises two lateral connecting rods arranged on each side of a central casing of the engine, each lateral connecting rod being connected firstly to a forward part of the central casing of the engine, and secondly to one of said forward and aft mounts of the system.

8. A system according to claim 1, characterized in that the device for resisting thrusts generated by the engine comprises a spreader beam provided with an upper arm and two lateral lower arms, the upper and lateral lower arms being fixed and fitted with an upper end and two lateral lower ends of the spreader beam the two lateral lower ends being placed such that a horizontal plane passes through them and through a longitudinal axis of the engine, the device for resisting thrusts generated by the engine also being fitted with two fittings on each side of the engine and each comprising a forward end through which the horizontal plane passing through the longitudinal axis of the engine also passes, and fixed to a forward part of a central casing of the engine, and an aft end connected to one of the two lateral lower ends of the spreader beam, and in that said spreader beam is also connected to the forward mount of the system, and to the rigid structure of the attachment strut through its upper end.

9. A system according to claim 8, characterized in that said spreader beam is connected to the forward mount through at least one swivel pin oriented along a transverse direction of the aircraft.

10. A system according to claim 8, characterized in that the upper end of the upper arm is connected to the rigid structure of the attachment strut using a connecting rod.

11. A system according to claim 10, characterized in that said connecting rod connecting the upper arm to the rigid structure of the attachment strut is oriented approximately along a longitudinal direction of the engine.

12. A system according to claim 8, characterized in that each of the aft ends of the two fittings fixed to the forward part of the central casing of the engine is connected to one of the two lateral lower ends of the spreader beam using a connecting rod.

13. A system according to claim 1, characterized in that the device for resisting thrusts generated by the engine comprises two lateral actuators arranged one on each side of the engine, each actuator being provided with a rod in which the aft end is connected to one of said forward and aft mounts for which a forward end is a piston located inside a chamber fixed to a forward part of a central casing of the engine said chamber comprising a forward compartment and an aft compartment separated by said piston; and in that said device for resisting thrusts generated by the engine also comprises a hydraulic piston device comprising a piston fixed to the forward mount and located inside a chamber fixed to said forward part of the central casing of the engine, said chamber comprising a forward compartment and an aft compartment separated by said piston said forward compartment of said chamber of the hydraulic piston device being hydraulically connected to said aft compartments of the lateral actuators.

14. A system according to claim 13, characterized in that said aft compartment of said chamber of the hydraulic piston device is hydraulically connected to said forward compartments of the lateral actuators.

15. A system according to claim 13, characterized in that said forward compartments of the two lateral actuators are hydraulically connected, and in that said aft compartments of these two lateral actuators are also hydraulically connected.

16. A system according to claim 13, characterized in that said chambers are formed inside the forward part of the central casing of the engine.

17. A system according to claim 13, characterized in that the aft end of each of the two actuator rods is connected to said forward mount.

18. A system according to claim 13, characterized in that the forward compartment of the chamber of the hydraulic piston device is hydraulically connected only to the aft compartments of the lateral actuators.

19. A system according to claim 13, characterized in that said forward compartment of the hydraulic piston device is also hydraulically connected to a high pressure hydraulic supply and is provided with at least one leak orifice for which access can be enabled/disabled by a device fixed to said piston, as a function of the hydraulic pressure inside the forward compartment, and as a function of thrusts generated by the engine.

20. A system according to claim 19, characterized in that said aft compartment of the hydraulic piston device is also hydraulically connected to a high pressure hydraulic supply and is provided with at least one leak orifice for which access can be enabled/disabled by a device fixed to said piston, as a function of the hydraulic pressure inside the aft compartment and as a function of reverse thrusts generated by the engine.

21. A system according to claim 1, characterized in that said forward mount is fixed to a forward part of a central casing of the engine and a forward end of a pyramid forming a forward part of the rigid structure of the strut, and in that said aft mount is fixed to an aft part of the central casing of the engine and the rigid structure of the strut.

22. Attachment strut for an aircraft engine under a wing of an aircraft, said strut being provided with a mounting system inserted between said engine and a rigid structure of the strut, characterized in that said mounting system is a system according to claim 1.

* * * * *